Patented Feb. 17, 1931

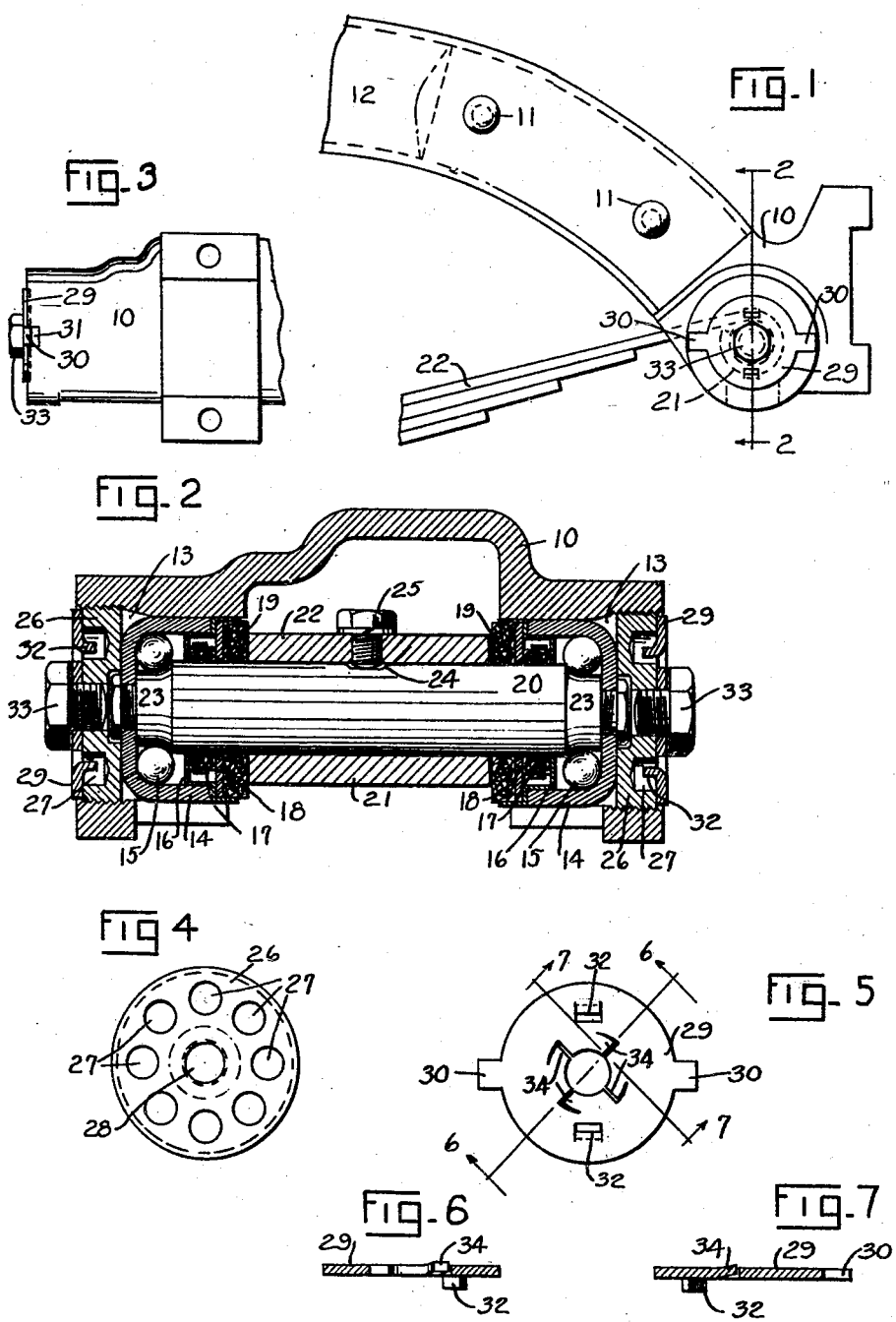

1,793,277

UNITED STATES PATENT OFFICE

HAROLD E. CHURCHILL, OF SOUTH BEND, INDIANA, ASSIGNOR TO THE STUDEBAKER CORPORATION, OF SOUTH BEND, INDIANA, A CORPORATION OF NEW JERSEY

SPRING SUPPORT

Application filed August 16, 1928. Serial No. 299,908.

This invention relates to spring suspension means for motor vehicles and particularly to means for supporting the pivoted ends of the springs.

In constructions used in the past in which the springs are provided with shackles at one end and pivoted directly to the frame at their other ends, each spring is pivoted directly to a bolt carried by the frame. There are many objections to the use of this type of construction, the principal objectionable feature being that there is no provision for the adjustment of the parts to compensate for wear of the same. Another objection is that the friction surfaces have no means for satisfactorily lubricating the same, which results in a tendency for these parts to squeak and rattle.

It is therefore, the principal object of this invention to provide a vehicle chassis with a new and improved means for supporting the pivoted ends of the springs.

Another object is to provide a vehicle chassis having ball bearings for supporting the pivoted ends of the vehicle springs, with adjusting means for the bearings, and with means for locking the adjusting means against rotation.

A further object is to provide a ball bearing support for vehicle spring pivot pins with rotatable members threaded in the vehicle frame spring support for adjusting the bearings, locking plates held against rotation by the spring supports having projecting portions extending into openings in the adjusting members for locking the same against rotation, and screws securing the locking and adjusting members together.

These being among the objects of the present invention the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a side elevation showing a portion of the frame, the frame spring horn of a motor vehicle and the front end of a leaf spring pivoted thereto.

Figure 2 is an enlarged section taken on the line 2—2 of Figure 1 showing in detail the means for pivoting the spring end to the spring hanger.

Figure 3 is a front elevation of the spring hanger shown in Figure 1.

Figure 4 is a plan view of one of the bearing adjusting members.

Figure 5 is a plan view of one of the adjusting member locking plates.

Figure 6 is a section taken on the line 6—6 of Figure 5.

Figure 7 is a section taken on the line 7—7 of Figure 5.

Referring to the accompanying drawing in which like numerals refer to like parts throughout the several views, the spring horn or spring hanger 10, as it will be called in the following description, is secured by rivets 11 to the end of the vehicle frame side member 12. The spring hanger 10 is bifurcated on its under side as shown in Figure 2 to provide two side portions having cylindrical openings or passageways 13 which are in axial alignment with each other. Each of the passageways at its inner end receives a cup-shaped ball race member 14 having a plurality of ball bearings 15 therein. Each ball race member 14 telescopically receives a portion of a grease washer retainer 16 having stepped walls, the remaining portion thereof being received by the passageway 13.

The smallest diametered portion of the retainer 16 receives a greaser washer 17 of felt or some other suitable material and a metallic washer 18 abuts against the stepped portion of the retainer 16 to retain the grease washer 17 therein. The largest diametered portion of the retainer 16 likewise receives a fibrous washer 19 which abuts against the metallic washer 18. The purpose of the fibrous washer 19 is to prevent dust, moisture and the like from working past the grease washer 17 and to exclude the same from the bearings 15. All of the parts 16, 17, 18 and 19 in each passageway 13 are formed with central aligned openings which receive the ends of the spring end bearing pin 20. This pin 20 extends transversely through an eye 21 formed in the end of the vehicle spring 22 and the extreme ends of the pin 20 are formed with fillets 23 of the same contour as the bearings 15 which are engaged by the ball bearings 15. The pin 20 is milled off intermediate its ends to form a flat face 24 against which a cap screw 25 threaded through the spring eye 21 abuts to anchor the pin against movement transversely of the spring 22 and also to hold the same against rotation.

As shown in Figure 2 the outer ends of the passageways 13 are internally threaded and receive externally threaded nuts 26 which are threaded into the passageways 13 to abut against the ends of the bearing cups 14. The cups 14 are in this way held against any transverse movement which might be caused by a tendency of the spring 22 to move transversely relative to the spring hanger 10. It can be seen here, because of the fact that the pin 20 engages the bearings 15 and because it is held against movement transversely of the spring 22, that there is no metal to metal contact between the sides of the spring 22 and the hanger 10 with the result that there is no chance for the same to squeak and wear rapidly. The only friction surfaces are between the ball bearings 15, the race members 14 and the filleted ends 23 of the pin 22, but because of the rolling contact between these parts friction and therefore, wearing of the parts is reduced to a minimum.

The present invention deals with the adjustment of the bearing members and therefore, means for holding the adjusting nuts 26 in any desired position. Each bearing adjusting nut 26 is formed with a plurality of recesses 27 arranged in circular form and with a threaded central opening 28. Each nut 26 is threaded into the passageway 13 until the proper pressure is reached between the ends of the spring bearing pin 20 and the bearings 15. This pressure is determined by the freedom of movement of the spring 22. The bearing adjusting nuts 26 are then locked in the correct positions by lock plates 29. As shown in Figures 2, 3 and 5, each locking plate 29 is formed from a flat metallic plate circular in shape, having a pair of diametrically opposite tongues 30 which, when in operative position, are received in notches 31 formed in the end faces of the spring hanger 10. Each locking plate 29 is further provided with a pair of ears 32 which are struck from the metal thereof to extend perpendicular thereto. These ears 32 extend into a pair of the recesses 27 in the adjusting nuts 26 so that the nuts are held against rotation. The locking plate is held in place by means of a cap screw 33 extending therethrough which is threaded into the central opening 28 in the adjusting nut 26. The locking plate 29 is formed as shown in Figures 5, 6 and 7 with four projections 34 struck therefrom and surrounding the central opening therein which bear against the head of the cap screw 33. These projections 34 serve as a friction lock for the cap screw 33 and eliminate the use of an extra lock washer.

From the drawings and the foregoing description it is plainly evident that a very simple and effective means is provided for locking the bearing adjusting nuts against inadvertent rotation. In summing up, this locking means comprises a lock plate 29 secured to the adjusting nut 26 and engaging the nut 26, tongues 30 thereon seated in depressions 31 in the spring hanger or bearing housing 10, and projections 34 thereon engaging the head of the securing screw 33.

It is to be understood that formal changes may be made in the specific embodiment of the invention described without departing from the spirit and substance of the broad invention, the scope of which is commensurate with the appended claims.

What I claim is:—

1. The combination with an anti-friction bearing for supporting a vehicle spring in a vehicle frame member, of an adjusting nut for said bearing received by said frame member and having a plurality of transverse openings in one face thereof, a locking plate having projecting tongues thereon seated in recesses in said frame member to prevent rotation thereof also having integral projections extending into certain of said openings for locking said adjusting nut against rotation, and screw means securing said locking plate against said adjusting nut.

2. The combination with an anti-friction bearing for pivoting a vehicle spring to a spring hanger, of an adjusting nut for said bearing threaded into said hanger and having a plurality of apertures therein, a locking plate in co-axial alignment with said adjusting nut having integral projecting fingers extending into certain of said apertures in said nut, diametrically opposite tongues on said plate having engagement with notched portions of said hanger to lock said adjusting nut against rotation, and screw means securing said locking plate against said adjusting nut.

3. The combination with an anti-friction bearing for pivoting a vehicle spring to a spring hanger, of an adjusting nut for said bearing, a locking plate for said nut, a bolt for securing said plate against said adjusting nut, and a plurality of integral tongues on said plate frictionally engaging the head of said bolt to hold the same against rotation.

4. A spring shackle comprising, a spring hanger, a spring supporting pin mounted therein, an adjusting plug for said pin threaded into said hanger, a locking plate held stationary by said hangar and having portions engaging said plug to hold the same against rotation, a bolt securing said plate against said plug, and a plurality of integral raised portions on said plate frictionally engaging the head of said bolt to lock the same against rotation.

5. A spring shackle comprising, a spring hanger, a spring supporting pin mounted therein, an adjusting plug for said pin threaded into said hanger provided with a plurality of openings, a locking plate having integral ears extending into certain of said openings, oppositely disposed tongues on said plate seated in notches formed in said hanger to lock said adjusting plug against rotation, a bolt securing said plate against said plug, and a plurality of raised projections on said plate frictionally engaging the head of said bolt to hold the same against rotation.

Signed by me at South Bend, Indiana, this 14th day of August, 1928.

HAROLD E. CHURCHILL.